Patented Mar. 12, 1929.

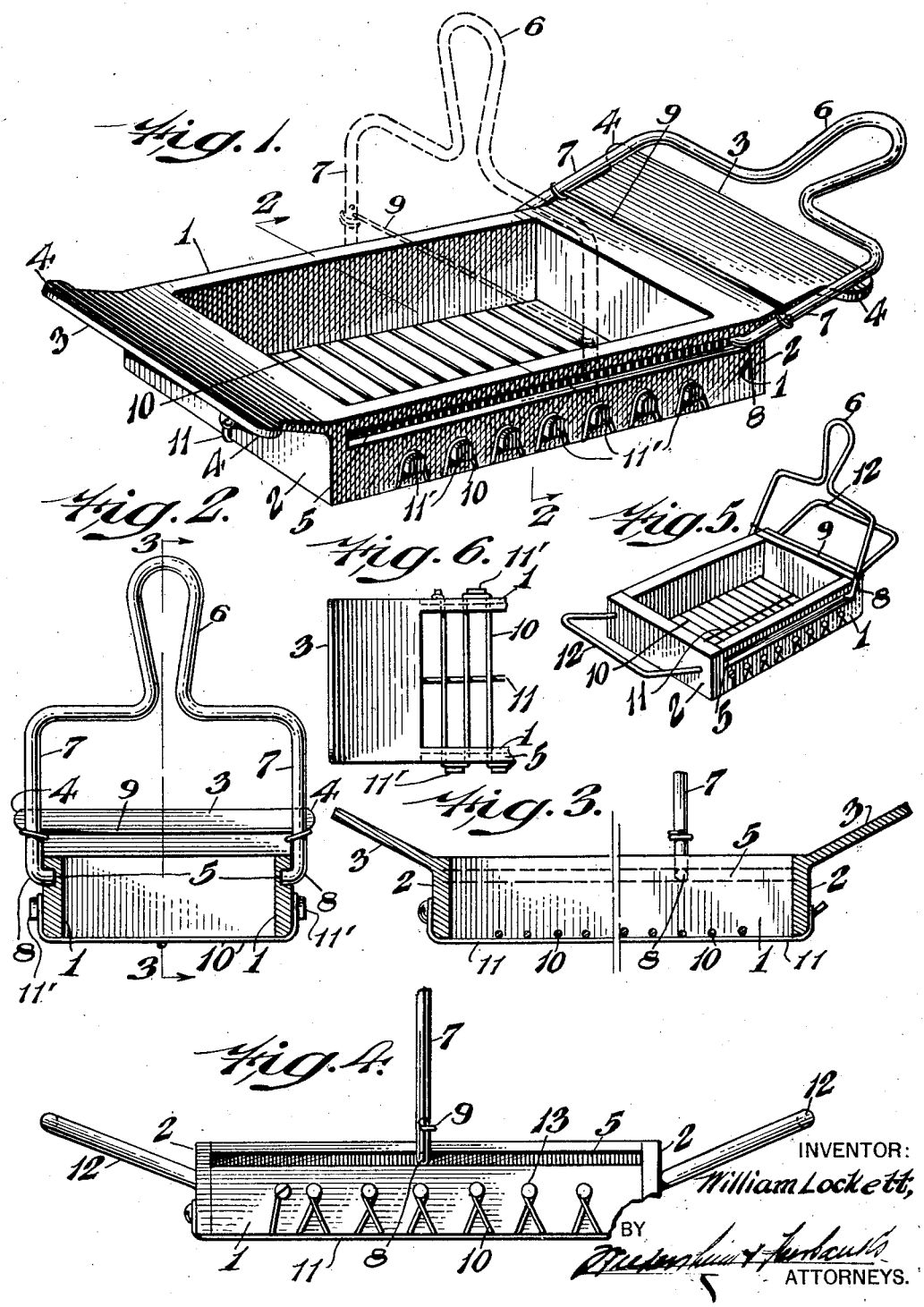

1,705,257

UNITED STATES PATENT OFFICE.

WILLIAM LOCKETT, OF PHILADELPHIA, PENNSYLVANIA.

BUTTER CUTTER.

Application filed September 19, 1927. Serial No. 220,323.

This invention relates to a novel construction of butter cutter and has more especial relation to an improved type over that shown in my U. S. Letters Patent No. 1,501,673, dated July 15, 1924.

The leading object of the present invention may be said to reside in the provision of a butter cutter provided with longitudinal guide ways for accommodating the handle carrying the cutting wire whereby the cutting wire is maintained free of the top edge of the main frame.

A further object is to provide end finger pieces or grips so arranged that they are inclined with respect to the main frame, thereby making it easier for the operator to press downward the cutter.

A still further object of the present invention is to provide means at each end of the cutter for supporting the movable handle at the end of its stroke, whereby not only is the cutting wire protected but the handle is permitted to lie in a more or less horizontal position to facilitate packing and shipping of the cutter.

Other and further objects not at this time appearing will be hereinafter set forth.

The invention consists of the novel construction hereinafter described and finally claimed.

The nature, characteristic features and scope of the invention will be more fully understood from the following description taken in connection with the accompanying drawings forming part hereof, and in which:

Fig. 1, is a view in perspective of a butter cutter embodying the invention, the handle supporting the transverse cutter being shown in operative and inoperative positions.

Fig. 2, is a view in cross section looking toward the right in Fig. 1.

Fig. 3, is a view in section taken upon the line 3—3 of Fig. 2.

Fig. 4, is a view in side elevation of a modified form of butter cutter.

Fig. 5, is a view in perspective of Fig. 4.

Fig. 6, is a fragmentary view in plan illustrating a modified form of finger piece.

For the purpose of illustrating my invention I have shown in the accompanying drawings several forms thereof which are at present preferred by me, since the same have been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring now to the drawings in detail, the reference numeral 1 designates the side pieces of the frame, and 2 designates the end pieces of the frame. These parts may be of integral structure as shown in Fig. 1 or may be in separate pieces as shown in Fig. 5. Referring now more especially to the type shown in Fig. 1, each end wall 2 is provided with a finger piece or grip 3. These finger pieces or grips 3 are oppositely disposed and are arranged at an inclination with respect to the end walls, said finger pieces being inclined in opposed relation. The finger pieces 3 are each provided with oppositely disposed, laterally extended lugs 4, the purpose of which will presently appear. Extending longitudinally of each of the side pieces 1 is a guide way 5. Adapted to be moved longitudinally along the butter cutter is a handle 6, the legs 7 of which at their lower extremities are inwardly turned as at 8, see Fig. 2, which parts 8 are adapted to track within the guide way 5. Thus the handle 6 is always maintained in interlocked position with respect to the frame. Extended transversely across the legs 7 of the handle 6 is a cutting wire 9 which cutting wire in the to and fro movement of the handle 6 is always free of the upper edges of the side pieces 1. Thus stress and strain upon the cutting wire is prevented. When the handle 6 is at the extreme end of the butter cutter and is not in use the handle may be moved about the inturned parts 8 of the legs 7 of the handle, which parts 8 act as pivot points, as clearly seen in Fig. 1. In this position the legs 7 of the handle rest upon the lugs 4, in which position of parts the cutting wire 9 is just free of a finger piece or grip 3 so that stress and strain is removed with respect to the said cutting wire. With the handle 6 in the position just described, it is not only out of the way when the device is not in use, but it facilitates the ready packing and shipping of the butter cutter since the package containing the butter cutter may be relatively shallow. Extended across the bottom of the side pieces 1 are the usual cutting wires 10, lugs 11' being provided upon the side pieces 1 by which the cutting wires are supported. Extending longitudinally of the cutter, and carried by the end walls 2 thereof, is a longitudinal cutting wire 11.

When a print of butter is to be severed by the above described device the latter is grasped by the finger pieces 3 and registered over the side edges of the butter and the frame forced gradually and firmly downward at which time the lower cutting wires will sever the block transversely and longitudinally at the same time. It is to be noted that the fingers of the operator are afforded additional space beneath the cutter as it is forced downwardly, thus eliminating the possibility of having the operator's fingers pinched at or about the time that the cutter has been forced entirely down upon the print of butter. The print of butter is divided horizontally by the cutting wire 9 as usual and in this connection it is to be noted that during the to and fro movement of the handle 6 the cutting wire 9 is maintained free of the top edges of the side pieces 1, this being possible as before described because of the guide ways 5 in which the ends of the handle travel.

Referring now to Figs. 4 and 5, the finger pieces or grips are designated 12 and are made of wire. These finger grips 12 are also inclined with respect to the end pieces of the frame. In this construction the frame is usually made of wood and the cutting wires 10 may be supported by pins 13 carried by the side pieces 1.

Referring now to Fig. 6, the construction is the same as that shown in Fig. 1 with the exception that the lugs 4 shown in Fig. 1 are omitted.

It will now be apparent that I have devised a novel and useful construction which embodies the features of advantage enumerated as desirable in the statement of the invention and the above description and while I have in the present instance shown and described the preferred embodiments thereof which have been found in practice to give satisfactory and reliable results, it is to be understood that the same are susceptible of modification in various particulars without departing from the spirit or scope of the invention or sacrificing any of their advantages.

Having thus described my invention, what I claim as new, and desire to secure by Letters Patent, is:

In a device having a frame open top and bottom, a longitudinally extended groove arranged upon each side of said frame, cutting elements arranged across the frame bottom, a handle extended transversely across the frame top, said handle having parts engaging said grooves and adapted for longitudinal travel therealong, a cutting element extended across and supported by the handle parts, said element being arranged to be free of the frame upper edge during handle travel therealong, in combination with hand-grips arranged at an inclination to the frame ends, laterally disposed lugs carried by the free ends of said hand grips, which lugs are adapted for handle support at pre-determined periods.

WILLIAM LOCKETT.